Sept. 13, 1932.    A. T. WAKEFIELD    1,877,093

SLIP COUPLING

Filed Aug. 24, 1931

Inventor
Arthur T. Wakefield
By Mason Fenwick Lawrence
Attorney

Patented Sept. 13, 1932

1,877,093

UNITED STATES PATENT OFFICE

ARTHUR THOMAS WAKEFIELD, OF BALTIMORE, MARYLAND, ASSIGNOR TO THE AMERICAN OIL COMPANY, OF BALTIMORE, MARYLAND

SLIP COUPLING

Application filed August 24, 1931. Serial No. 559,110.

This invention relates to slip coupling and more particularly to an improved structure for slip coupling adapted to provide an efficient seal between parts of a fluid carrying conduit.

The object of the invention is to provide a device of the character indicated designed to be used both as a slip joint and a rotating joint and is held on to the tubing solely by frictional engagement, which restricts the fluid carried by said conduit from leaking back when the pipe is in perpendicular position.

Other objects of the invention will appear as the following description of a preferred and practical embodiment thereof proceeds.

The invention consists in the novel construction, arrangement and combination of parts hereinafter more particularly described and claimed.

Figure 1:
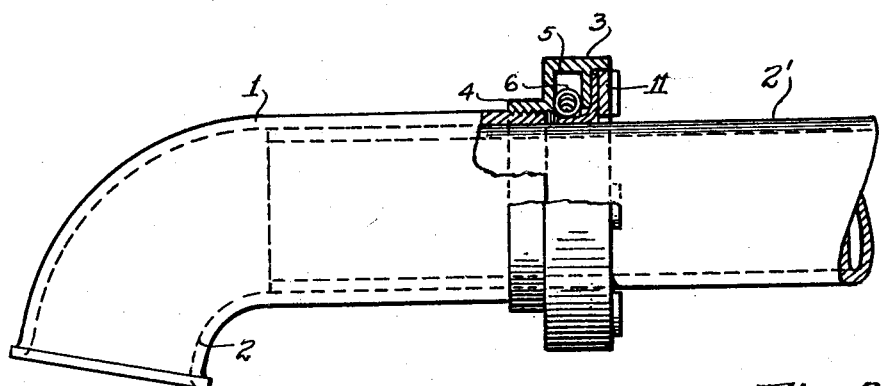
Figure 1 is a side elevation of the improved coupling applied to the discharge end of a gasoline discharge pipe by way of illustration.
Figure 2:
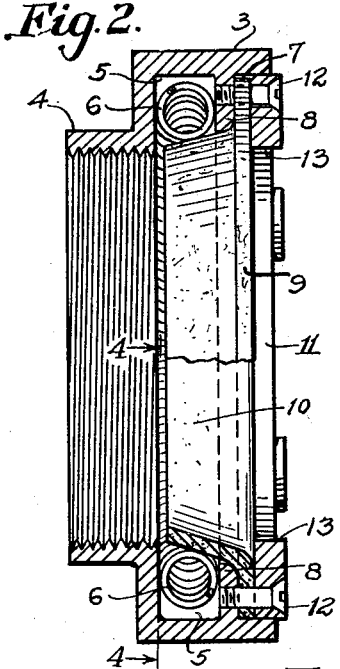
Figure 2 is a vertical cross section.
Figure 3:
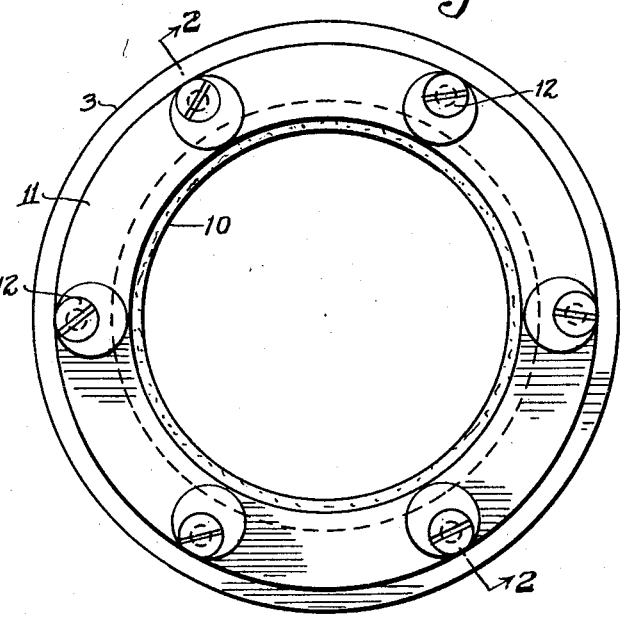
Figure 3 is an end plan.
Figure 4:
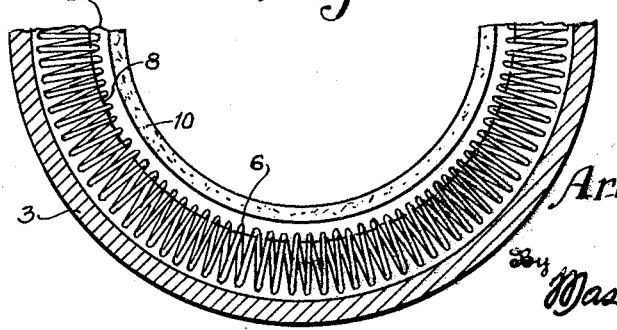
Figure 4 is a fragmentary cross section taken on line 4—4 of Figure 2.

Referring to the drawing, 1 indicates the end pipe section having a suitable discharge terminal 2. The adjacent conduit member 2 is arranged to extend within part 1 in slidable and rotary association therewith.

The improved slip joint 3 consists essentially of a ring member having an attachment part 4 of reduced diameter suitably threaded internally or provided with other means for attachment to a tubular member. Within the ring member 3 is provided an internally directed annular flange 8 which constitutes a wall of an annular groove 5 within which may be permanently seated a spiral spring 6. A flexible washer 9 seats against the other face of the wall flange 8, this washer 9 being provided with an apron 10 which extends within the spiral spring 6 and over the annular groove 5.

The washer 9 is secured upon its seat on flanged wall 8 by means of an annular ring 11 which is secured over the washer and flanged wall 8 by means of screws 12. This ring 11 is provided with an internal ring face 13 adapted to form a seat and guide for a tubular member properly positioning such member with respect to the apron of the washer 9 and the interior of the complementary tubular member.

Various modifications will readily suggest themselves to those skilled in the art, but within the scope of the present invention as claimed.

What I claim is:

1. A slip joint connection comprising a ring member having a reduced size connecting part, and an inwardly directed annular flange constituting a wall for an internal annular groove and an annular seat for a washer, spring means in said annular groove, and a washer secured on said seat having an apron extending within the spring means.

2. A slip joint connection comprising a ring member having one end reduced and provided with means for attachment to a pipe or the like, an inwardly directed annular flange constituting a wall for an internal annular groove and an annular washer seat, spring means in said annular groove, a flexible washer having an annular seat part and an annular apron part extending within said spring means and a locking ring adapted to secure said washer to said annular flange seat.

In testimony whereof I affix my signature.

ARTHUR THOMAS WAKEFIELD.